United States Patent [19]

Van Elk et al.

[11] 3,823,266

[45] July 9, 1974

[54] SYNCHRONIZATION SYSTEM

[75] Inventors: Cornelis Johannes Van Elk; Albertus Marinus Morrien, both of Hilversum, Netherlands

[73] Assignee: U.S. Philips Corporation, New York, N.Y.

[22] Filed: July 14, 1972

[21] Appl. No.: 271,832

[30] Foreign Application Priority Data

July 21, 1971 Netherlands ........................ 7110002

[52] U.S. Cl. ............................ 178/69.5 R, 325/325

[51] Int. Cl. ............................................ H04l 7/00

[58] Field of Search ................ 178/69.5 R; 325/325; 179/15 BS

[56] References Cited

UNITED STATES PATENTS 3,551,816 12/1970 Paine ............................ 178/69.5 R 3,575,554 4/1971 Schmidt ........................ 178/69.5 R

*Primary Examiner*—Robert L. Richardson

*Attorney, Agent, or Firm*—Frank R. Trifari

[57] ABSTRACT

A signal receiver for a radio communication system with transmission of information in sequential frames of a synchronous data signal. A synchronization word is transmitted in each frame. The receiver comprises a frame synchronizer for synchronizing the cycle of a timing unit with the frame of the data signal. The frame synchronization word is applied to the synchronizer indirectly, after having been error corrected in a majority decision unit which combines three bits mutually delayed by a frame interval into one bit.

2 Claims, 3 Drawing Figures

SYNCHRONIZATION SYSTEM

The invention relates to a signal receiver for a radio communication system with transmission of information in sequential frames a synchronous data signal, given bit positions of which are used for transmitting a frame synchronization word, said receiver comprising a frame synchronizer for synchronizing the frame of the receiver to the frame of the data signal, said synchronizer comprising a pattern-recognition circuit for detecting the frame synchronization word.

A problem occurring in selective largescale paging systems is the variable and usually small value of the signal-to-noise ratio, so that the certainty that a call will be successful is generally poor when use is made of simple and cheap receivers. Paging systems can operate with different modulation and coding methods. In this context systems will be considered in which the calls are binary coded and are transmitted as a succession of bits in a continuous synchronous bit stream. In some systems with intermittent operation a unique synchronization word is transmitted prior to each call for the bit synchronization of the receivers and for synchronizing the receivers with respect to the beginning of the call. In systems where a bit stream is continuously transmitted, the bit stream can be divided into frames in which the calls occupy fixed positions and it is merely necessary to transmit frame synchronization information from time to time, normally once per frame, to keep the receivers synchronized. Even though such synchronous systems can also operate reliably at small values of the signal-to-noise ratio due to their ability to regenerate bits, disturbances and fading can cause errors which make reliable synchronization of the receivers to the frames difficult.

Various pattern recognition circuits and synchronization algorithms for achieving synchronization in the case of errors are known, said algorithms forming a compromise between the speed at which synchronization is achieved and the degree of certainty that the correct synchronization condition will indeed be reached. The invention has for its object to provide a signal receiver of the kind set forth which incorporates newly conceived facilities to increase the reliability of the frame synchronization.

The signal receiver according to the invention is characterized in that in the receiver each bit of the data signal is applied, together with the two preceding bits which are received one and two frames earlier, respectively, to a majority-decision unit which combines the three bits to form one bit, the value of which corresponds to the value of the majority of the three bits, the pattern-recognition circuit of the synchronizer being influenced by the corrected data signal which appears on the output of the majority-decision unit.

The invention and its advantages will be described in detail with reference to the Figures. Therein:

It is to be noted that the specific data of the paging system to be described hereinafter have merely an illustrative meaning and are given only to facilitate the description. No restriction of the invention can be deduced therefrom.

Figure 2:
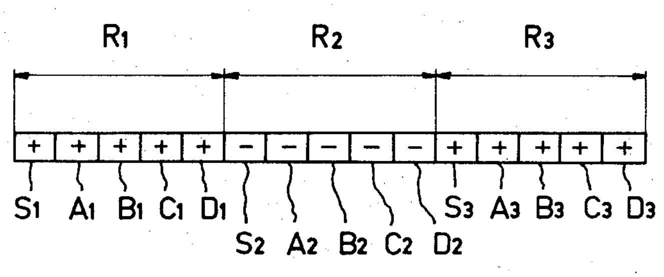
FIG. 2 shows a diagram illustrating the formation of a super frame.

In the paging system under consideration a synchronous bit stream is transmitted by a central transmitter at a rate of 200 bits/s. This bit stream is divided into super frames, each of which comprises three frames. FIG. 2 illustrates one super frame. The three frames of a super frame are denoted by R1, R2 and R3. Each frame is divided into a synchronization period S and four address periods A, B, C, D as is shown in FIG. 2. Each of these periods comprises a word of 20 bits. The first 15 bits of the 20 bits of an address period are used for the address information, the last 5 bits being used for transmitting a message. The address information and the message information for a given subscriber (the combination of these informations being referred to as the subscriber information) is transmitted three times in a super raster in corresponding address periods of the three frames, so for example, in the address periods A1, A2 and A3. These three transmissions together constitute one call. So as to enhance the certainty that the desired subscriber is indeed reached, the call can be repeated, for example, after approximately 20 seconds. In the synchronization periods S a unique synchronization word is transmitted to which the receivers can be synchronized.

Super-frame synchronization is realized by transmitting the bits of the synchronization word with reversed polarity in the period S2. For reasons which will be described hereinafter, all bits in frame R2 are transmitted with inverted polarity, i.e., also the bits of the subscriber information. This is denoted in FIG. 2 by a + sign in all periods in which the bits are transmitted with the normal polarity, and by a − sign in all periods in which the bits are transmitted with reversed polarity.

The bit stream is modulated on an HF carrier by FSK modulation, and is transmitted to the signal receivers. In a signal receiver (FIG. 1) the HF carrier is received by an antenna 10 and is applied, via an HF pre-amplifier 11 to a mixer stage 13 which is controlled by a local oscillator 12 and which converts the HF carrier into an IF carrier. The IF carrier is applied, via an IF filter 14 and an IF amplifier 15, to an FM discriminator 16. The output signal thereof is applied to a bit regenerator 17 and a clock regenerator 18. As already stated, the bit stream is a synchronous bit stream, i.e., a stream of bits whose instants of occurrence coincide with a series of equidistant bit clock pulses which are generated in the transmitter and which are used therein for the timing of the bits. The clock regenerator 18 regenerates the clock of the bit stream from the zero passages of the demodulated data signal, which appears on the output of the FM discriminator 16. Clock regenerators of this kind are well known and need not be described. Clock regenerator 18 produces equidistant clock pulses which are applied to various parts of the receiver so as to control the operation thereof. A series of clock pulses is applied to the bit regenerator 17. These clock pulses determine the instants at which the demodulated data signal is sensed by the bit regenerator so as to determine the value of the bits A commonly used method is the sensing of the signal elements of the demodulated data signal at the centre. On the output of bit regenerator 17 a regenerated bit stream appears which is a copy of the transmitted bit stream. In this copy a bit error appears each time that the bit regenerator designates a bit value to a signal element which differs from the value at which the signal element has been transmitted. Bit errors of this kind can be caused by HF interference or fading of the HF carrier.

Figure 1:
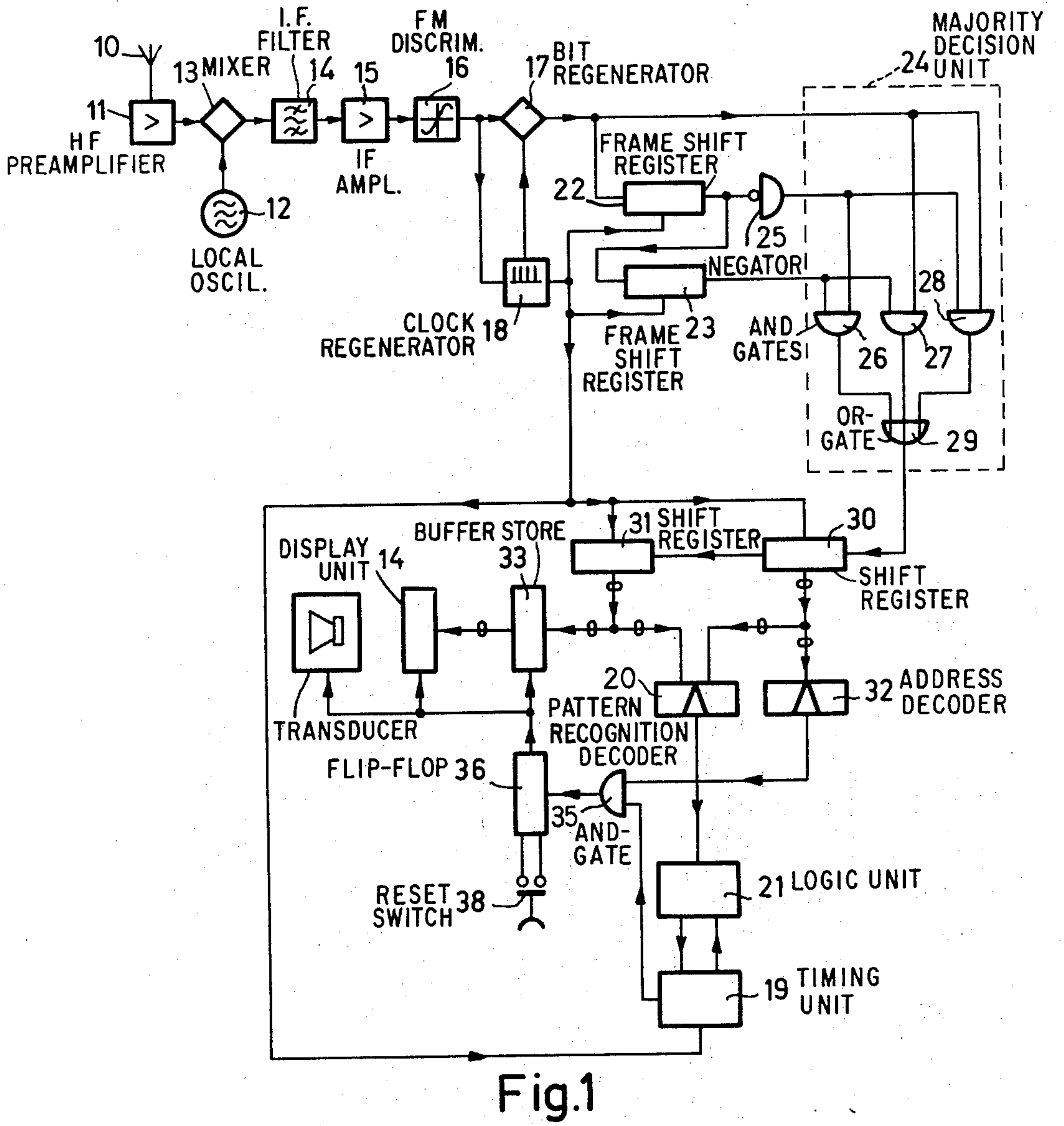
FIG. 1 shows a block diagram of an embodiment of the signal receiver according to the invention.

A series of clock pulses is applied to the timing unit 19, which comprises mainly a number of cascaded pulse counters. The first of these counters is a modulo-20 counter which counts the bits in a period. The second of these counters is a modulo-5 counter which numerates the periods in a frame, the third counter being a modulo-3 counter which numerates the frames in a super frame. The timing unit 19 has a cycle whose length is equal to a super frame. So as to ensure that these numbers correspond to the actual numbers of the data signal as it is received, the cycle of the time unit 19 must be synchronized with the super frame of the received data signal. This is realized by means of a synchronizer which comprises a pattern-recognition circuit 20 and a logic unit 21. The pattern-recognition circuit 20 is shown in FIG. 1 in the form of a decoder which supplies a signal only if the word applied thereto is the synchronization word. In this context and hereinafter it is to be understood that the presence of a signal corresponds to the presence of a first logic signal level and that the absence of a signal corresponds to the presence of a second logic signal level.

In known signal receivers the regenerated bit stream is directed forced to flow along the pattern recognition circuit 20, in which each bit and the 19 preceding bits, considered as one word, are tested as regards their resemblance to the synchronization word. The output of the decoder 20 is connected to the logic unit 21, which has a forward and a return connection with the timing unit 19. Via the forward connection, commands can be given for shifting the timing cycle, the logic unit 21 being informed about the appearance of the synchronization periods via the return connection. Errors in the regenerated bit stream will influence the synchronization process and will notably increase the time which is required to regain synchronization after loss of synchronization, the so-termed acqusition time. Consequently, when comparatively many errors occur, i.e., at small values of the signal-to-noise ratio, the pattern-recognition circuits are constructed in practice as digital filters which are based on correlation techniques. These filters give a reaction which is a measure for the resemblance or correlation between the examiner words and the synchronization word. If this reaction exceeds a threshold, this is assumed to be an indication of the presence of a synchronization word. The threshold can have different values in different phases of the synchronization process in order to increase the degree of certainty that the correct synchronization is indeed achieved. Synchronizers of this kind are less sensitive to errors than when use is made of a decoder whch reacts only to the synchronization word.

In accordance with the invention, the regenerated bit stream is applied to two cascaded 100-bit shift registers 22 and 23 which are controlled by clock generator 18. Each of these shift registers introduces a delay of 100 bit positions or one frame. The outputs of bit regenerator 17, the output of register 22, and the output of shift register 23 are connected to different inputs of a majority-decision unit 24, the output of register 22 being connected via a NOT-element or negator 25. The majority-decision unit 24 comprises three AND-gates 26, 27 and 28, each of which combines the signals of two inputs. An OR-gate 29 combines the signals of the AND-gates and applies these signals to the output of the majority-decision unit. The majority-decision unit 24 operates in an obvious manner such that the value of each bit which is applied to the output is equal to the value of the majority of the bits which simultaneously appear on the three inputs.

In the correspondingly denoted periods of a super frame the same information is transmitted. When a bit of the frame $R_3$ appears on the output of bit regenerator 17, the corresponding bit of the frame $R_2$ appears on the output of register 22, and the corresponding bit of the frame $R_1$ appears on the output of the register 23. In this context corresponding bits are considered to be bits which transfer the same information. The bit which appears on the output of register 22 has reverse polarity and is converted into a bit having the normal polarity by the NOT-element 25. If no errors have occured in one of these bits, three bits of the same value are applied to the majority-decision unit 24, which then produces a bit having the same value. The majority decision unit supplies a correct bit also in the case where one of the bits is incorrect. The majority-decision unit supplies an incorrect bit only if two or three bits are incorrect. In this manner all error patterns comprising one error for each three corresponding bits are fully corrected during the appearance of the frame R3. Further insensitivity to interference is realized by polarity reversal of all information in the frame R2. If a bit of the frame R1 and the corresponding bit of the frame R2 are disturbed by the same unilateral disturbance, an error occurs in at the most one of these bits in the receiver. Error correction is then still possible. A unilateral disturbance is a disturbance which converts binary one into a zero and leaves a zero unchanged, or which converts a binary zero into a one and leaves a one unchanged. Since corresponding bits in the frames R1 and R2 are transmitted with reversed polarity, only one of these bits will be influenced by the disturbance.

Figure 3:
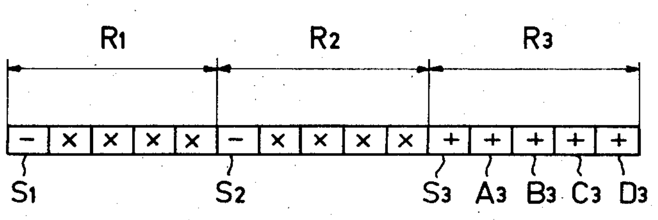
FIG. 3 shows a diagram illustrating the formation of the super frame of the corrected data signal.

It is to be noted that the result of the majority decision makes sense only in the period coinciding with the frame R3, as in the other frames a combination is formed of bits which transfer different informations. The synchronization periods S1 and S2 in the frames R1 and R2 form an exception in this respect. In these periods the majority-decision unit 24 supplies synchronization words of reversed polarity. This fact can be taken into account for the super frame synchronization, but will not be considered in this context. The super frame structure of the bit stream on the output of the majority-decision unit 24, referred to hereinafter as the corrected bit stream, is illustrated in FIG. 3. The X signs indicate in which periods the bits do not transfer relevant information. In the periods A3, B3, C3 and D3 corrected subscriber information appears, and in the period S3 a corrected synchronization word of positive polarity appears.

The corrected bit flow is applied to the cascaded shift registers 30 and 31 which are controlled by clock regenerator 18. The shift register 30 comprises 15 bit positions and the shift register 31 comprises 5 bit positions. Connected to the shift register 30 is an address decoder 32 which supplies a signal when the address of the signal receiver is detected. The pattern-recognition circuit 20 is connected to the shift register 30 and the shift register 31. Also connected to the shift register 31 is a message buffer store 33 which controls a display unit 34 for displaying the message.

The output of address decoder 32 is connected to the input of the AND-gate 35, a second input of which is supplied with a signal in the periods A3, B3, C3 and D3 by the timing unit 19. When the address of the signal receiver is detected in one of these periods, AND-gate 35 supplies a signal. This signal sets a flip-flop 36 to the state "1", the flip-flop then activating the buffer store 33 so as to take over the message information stored in the register 31. Simultaneously with the buffer store 33 the display unit 34 is activated, and so is an acoustic transducer 37. The flip-flop 36 can be manually reset to the state "0" by operating the reset switch 38. The synchronizer 20–21 effects super frame synchronization, using the corrected synchronization word of normal polarity which appears in the period S3. The synchronization algorithm is performed by the logic unit 21 which utilizes the signals from decoder 20 and timing unit 19, and commands to the timing unit 19 for shifting the timing cycle. The exact nature of the synchronization algorithm and the construction of logic unit 21 are not of interest in this context and will not be elaborated upon. Synchronizers of the kind under consideration and comprising a pattern-recognition circuit and a logic unit are well known, for example, in the technique involving P.C.M. time multiplex transmission, and each of these known synchronizers can be used for this purpose.

The error correction of the synchronization word before this word is applied to the pattern-recognition circuit reduces by a number of dB's the minim value of the signal-to-noise ratio at which the synchronizer 20–21 is still sufficiently effective. Thus at a given minimum signal-to-noise ratio, the synchronizer construction can be made less complicated. It was found that for signal-to-noise ratios as low as O dB proper functioning can be obtained by means of a pattern-recognition circuit in the form of a decoder and a synchronization algorithm which is not too complicated; this version of the pattern-recognition circuit would already fail at signal-to-noise ratios which are a number of dB higher if no error-correction were performed. So as to achieve active synchronization at smaller signal-to-noise ratios, yet the pattern-recognition circuit is preferably constructed as a digital filter with a variab'e decision threshold.

In systems in which no super frame is used, the synchronization word can still be corrected by a majority decision over three successive frames. The receiver shown in FIG. 1 can be used for this purpose. The only modification required is the replacement of the NOT-element 25 by a direct connection. The subscriber information, singularly transmitted in a system without super frame, will have to be corrected, if necessary, in another manner, for example, by using an error-correcting code.

What is claimed is:

1. A signal receiver for a radio communication system with transmission of information in sequential frames of a synchronous data signal, each signal frame containing a binary synchronization word, said receiver comprising a frame synchronizer with a bit pattern recognition circuit for detecting said word and synchronizing the frame of the receiver to the frame of the data signal, a majority-decision unit including means for combining each bit of the received signal frame with corresponding bits of two preceding frames to form one bit, the value of which corresponds the the value of the majority of the three bits, and said pattern-recognition circuit being coupled to the output of the majority-decision unit.

2. A signal receiver as claimed in claim 1, characterized in that the received data signal is applied, after regeneration, to two cascaded shift registers, each of which delays the data signal by one frame, the non-delayed data signal, the data signal delayed by the first shift register, and the data signal delayed by the two shift registers combined being simultaneously applied to a said majority-decision unit.

* * * * *

PO-1050
(5/69)

UNITED STATES PATENT OFFICE
CERTIFICATE OF CORRECTION

Patent No. 3,823,266 Dated July 9, 1974

Inventor(s) CORNELIS J. VAN ELK ET AL

It is certified that error appears in the above-identified patent and that said Letters Patent are hereby corrected as shown below:

Title Page Section [30] change "7110002" to

--7110022--.

Signed and sealed this 29th day of October 1974.

(SEAL)
Attest:

McCOY M. GIBSON JR.
Attesting Officer

C. MARSHALL DANN
Commissioner of Patents